United States Patent
Shiah et al.

(10) Patent No.: US 7,266,290 B2
(45) Date of Patent: Sep. 4, 2007

(54) REAL-TIME RICH MEDIA RECORDING SYSTEM AND METHOD

(75) Inventors: Aken Shiah, Shinjuang (TW); Andy Hsu, Shinjuang (TW); Chris Lin, Taipei (TW)

(73) Assignee: CyberLink Corporation (TW)

( * ) Notice: Subject to any disclaimer, the term of this patent is extended or adjusted under 35 U.S.C. 154(b) by 1161 days.

(21) Appl. No.: 10/215,296

(22) Filed: Aug. 8, 2002

(65) Prior Publication Data
US 2003/0126609 A1     Jul. 3, 2003

(30) Foreign Application Priority Data
Jan. 3, 2002     (TW)     ............... 91100039 A

(51) Int. Cl.
*H04N 5/76*     (2006.01)
*H04N 5/00*     (2006.01)
(52) U.S. Cl. ............................... 386/125; 386/69
(58) Field of Classification Search ........... 386/6–8, 386/45, 69–70, 125–126
See application file for complete search history.

(56) References Cited

U.S. PATENT DOCUMENTS

| | | | |
|---|---|---|---|
| 6,519,410 B1 * | 2/2003 | Okada et al. | 386/46 |
| 6,519,413 B1 * | 2/2003 | Ando et al. | 386/95 |
| 6,791,922 B2 * | 9/2004 | Suzuki | 369/47.3 |

* cited by examiner

*Primary Examiner*—Thai Q. Tran
*Assistant Examiner*—Nigar Chowdhury
(74) *Attorney, Agent, or Firm*—Fish & Richardson P.C.

(57) ABSTRACT

A real-time rich media recording system. The system includes a capture module, a recording module and a random access module. The recording module real-time records a rich media source captured by the capture module as digital data. The recording module constructs a rich media relational table, and inserts an event label into the rich media relational table in response to an action instruction. The random access module stops the recording process of the recording module in response to an interrupt instruction, locates a location in the digital data, disables the event labels located after the location in the rich media relational table, and reinstates the recording module to record the rich media source at the position following the location in the digital data.

27 Claims, 4 Drawing Sheets

REAL-TIME RICH MEDIA RECORDING SYSTEM AND METHOD

Pursuant to 35 U.S.C. § 119(a)-(d), this application claims priority from Taiwanese application no. 91100039, filed on Jan. 3, 2002.

BACKGROUND OF THE INVENTION

1. Field of the Invention

The present invention relates to a real-time recording system and method, and particularly to a real-time recording system and method in which rich media can be recorded and presented in combination with video clips in one pass.

2. Description of the Related Art

Digital data is easy to preserve and edit. Recently, many users process digital video data and edit personal video short presentations by video editing software in computers.

When users want to produce a presentation containing rich media, such as video, audio, slide show and web pages, different video editing software and media combination software applications are used to edit the video clips between video segments and combine the media in different formats, so as to generate the desired presentation.

FIG. 1 shows the conventional process of producing a rich media presentation. First, a video capture device 10 is employed to capture (record) videos. If the recording process is stopped as the result of an interruption or device error, video 1 is obtained. When the device error is overcome, the video capture device 10 can be continued to record other videos, such as video 2 and video 3.

After all desired videos are captured, video editing software 20 is used to edit these videos (video 1, video 2 and video 3), so as to obtain a completed video 21. If the desired video segment in video 1 is from position A to the end, the desired video segment in video 2 is from the beginning to position B and all of video 3 is desired, the completed video 21 is obtained by editing video 1, video 2 and video 3 as shown in FIG. 2.

Thereafter, if different media, such as slide show 22, are desired to be integrated into the completed video 21, media combination software is used to combine the slide show 22 with the completed video 21 to generate the rich media presentation.

In the conventional process, use of the video capture devices and video editing software are repeated to record and edit videos to generate a complete presentation, and additional media combination software is also employed to integrate various media into the final presentation. The operation of the conventional process is inconvenient and time-consuming, and difficult for general users.

SUMMARY OF THE INVENTION

It is therefore an object of the present invention to provide a real-time rich media recording system and method in which rich media can be recorded and presented in combination with video clips in one pass.

To achieve the above object, the present invention provides a real-time rich media recording system and method. According to one embodiment of the invention, the real-time rich media recording system includes a capture module, a recording module and a random access module.

The capture module captures a rich media source. The recording module real-time records the rich media source captured by the capture module as digital data into a non-sequential storage module. The recording module constructs a rich media relational table, and inserts an event label into the rich media relational table in response to an action instruction concurrent with the recording of the rich media source.

The random access module stops the recording process of the recording module in response to an interrupt instruction, locates a location in the digital data in the non-sequential storage module, disables the event labels located after the location in the rich media relational table, and reinstates the recording module to record the rich media source into the non-sequential storage module at the position following the location in the digital data.

According to the embodiment of the invention, the system further includes a preview module and a review module to display the rich media source and the digital data respectively.

According to the embodiment of the invention, the system further includes a play module to instruct a corresponding media player to play the digital data according to the event labels in the rich media relational table.

Further, according to a second embodiment of the invention, a real-time rich media recording method is provided. First, a rich media source is captured and recorded as digital data into a non-sequential storage module. Then, a rich media relational table corresponding to the digital data is constructed.

Afterward, an event label is inserted into the rich media relational table in response to an action instruction concurrent with the recording of the rich media source. Thereafter, the recording process is stopped in response to an interrupt instruction. Then, a location in the digital data in the non-sequential storage module is located, and the event labels located after the location are disabled in the rich media relational table. Finally, the rich media source is reinstated to be recorded into the non-sequential storage module at the position following the location in the digital data.

According to the embodiment of the invention, the method further displays the rich media source and the digital data.

According to the embodiment of the invention, the method further instructs a corresponding media player to play the digital data according to the event labels in the rich media relational table.

BRIEF DESCRIPTION OF THE DRAWINGS

The aforementioned objects, features and advantages of this invention will become apparent by referring to the following detailed description of the preferred embodiment with reference to the accompanying drawings, wherein.

DETAILED DESCRIPTION OF THE PREFERRED EMBODIMENT

Figure 1:
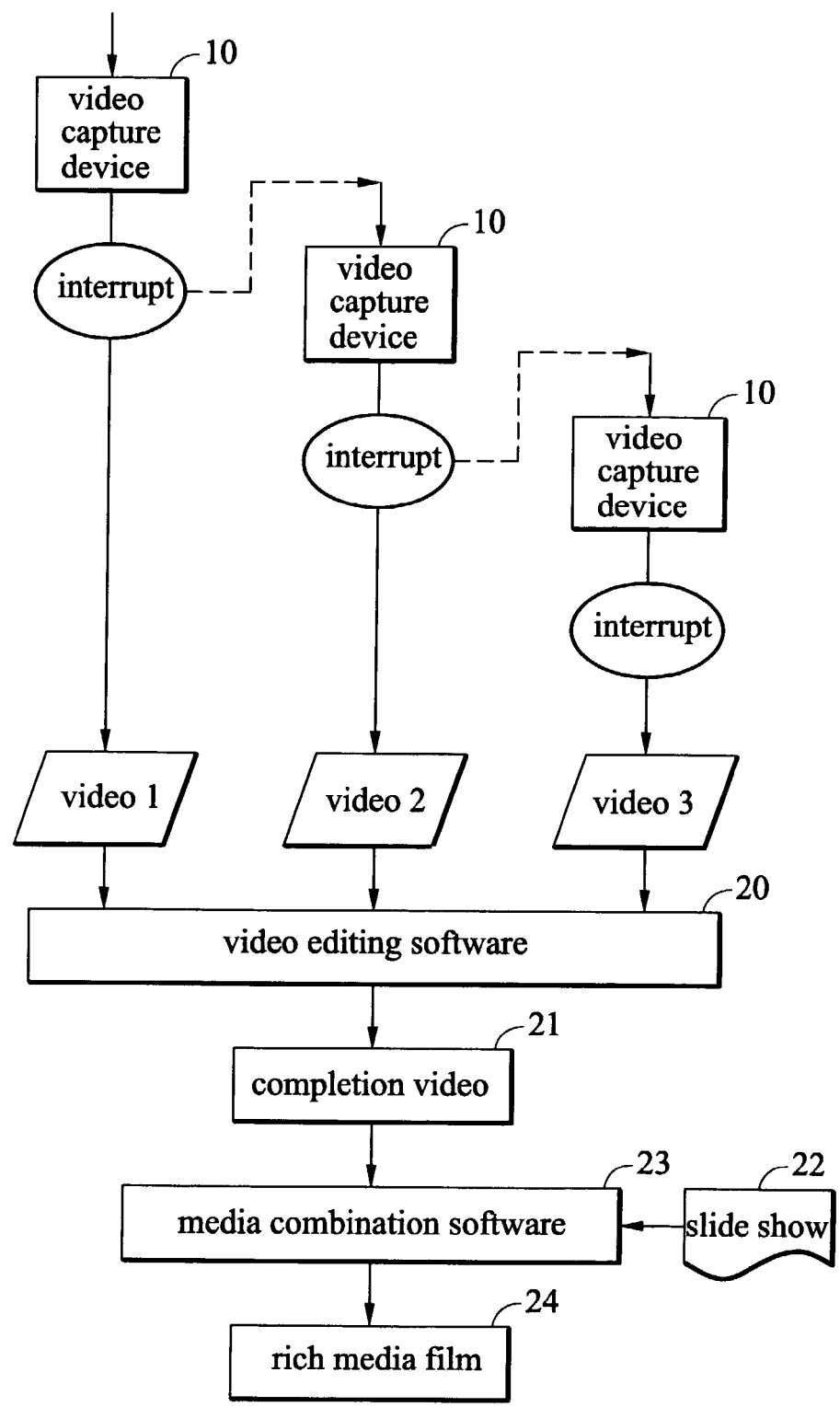
FIG. 1 is a schematic diagram showing the conventional process of producing a rich media presentation.
Figure 2:
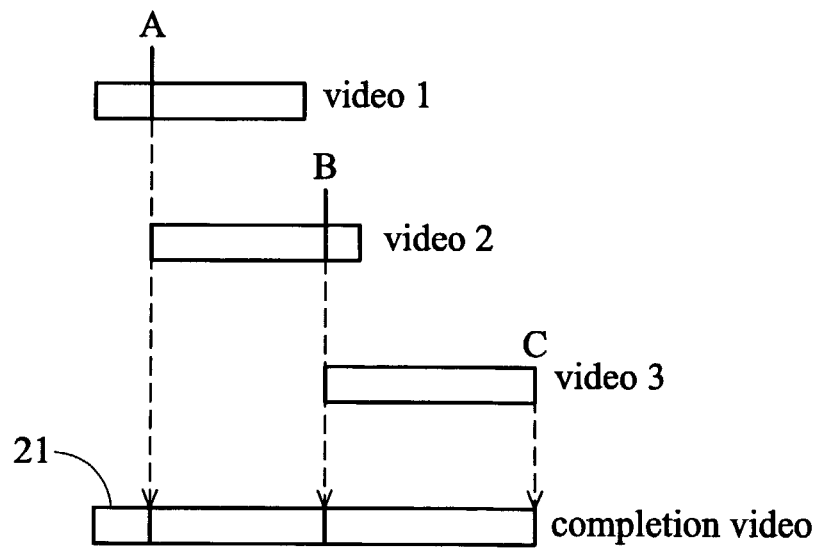
FIG. 2 is a schematic diagram showing the editing of three videos.
Figure 3:
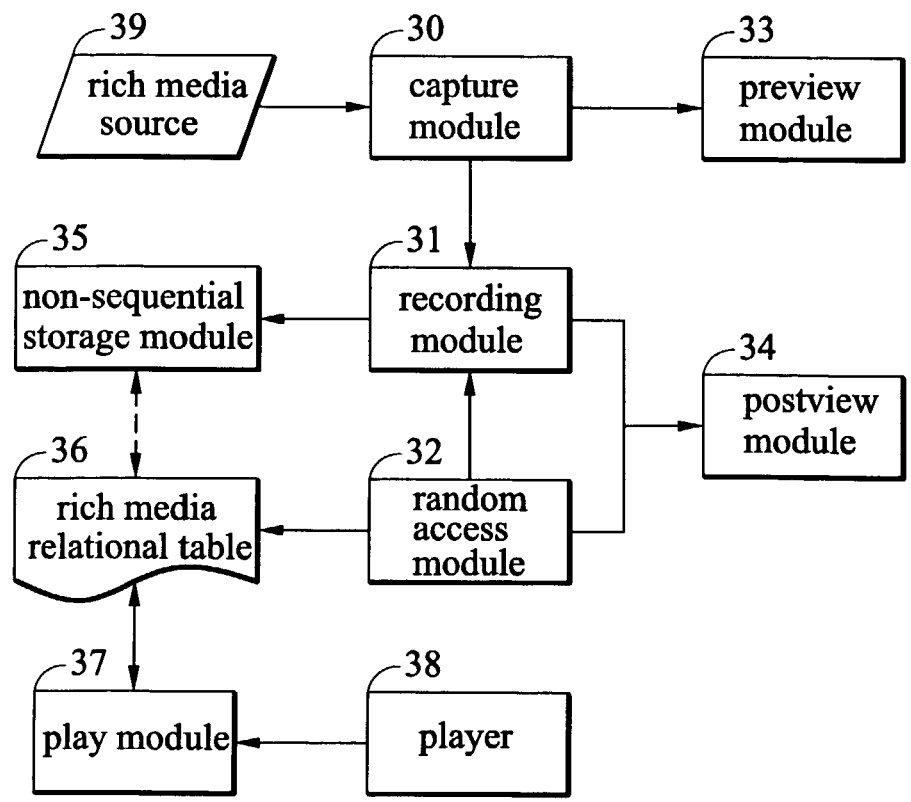
FIG. 3 is a schematic diagram showing the system structure of a real-time rich media recording system according to the embodiment of the present invention.

FIG. 3 shows the system structure of a real-time rich media recording system according to the embodiment of the present invention. Referring to FIG. 3, the real-time rich media recording system includes a capture module 30, a recording module 31, a random access module 32, a preview module 33, a review module 34, a non-sequential storage module 35 and a play module 37.

The capture module 30 captures a rich media source 39. The rich media source 39 may be media containing video, audio, slide show and web pages. The preview module 33 is coupled to the capture module 30 to display the rich media source 39 captured by the capture module 30.

The recording module 31 is also coupled to the capture module 30. The recording module 31 may real-time record the rich media source 39 captured by the capture module 30 as digital data (not shown) into the non-sequential storage module 35. At the same time, the recording module 31 constructs a rich media relational table 36 corresponding to the digital data, and the rich media relational table 36 may also be stored into the non-sequential storage module 35.

Note that the non-sequential storage module 35 may be a hard disk, memory, or rewritable CD (compact disc). The rich media relational table 36 is used to record the time relation between different media.

If the recording module 31 receives an action instruction, such as a command to insert a slide show, the recording module 31 inserts an event label (not shown) into the rich media relational table 36 in response to the action instruction concurrent with the recording of the rich media source 39.

Figure 4:
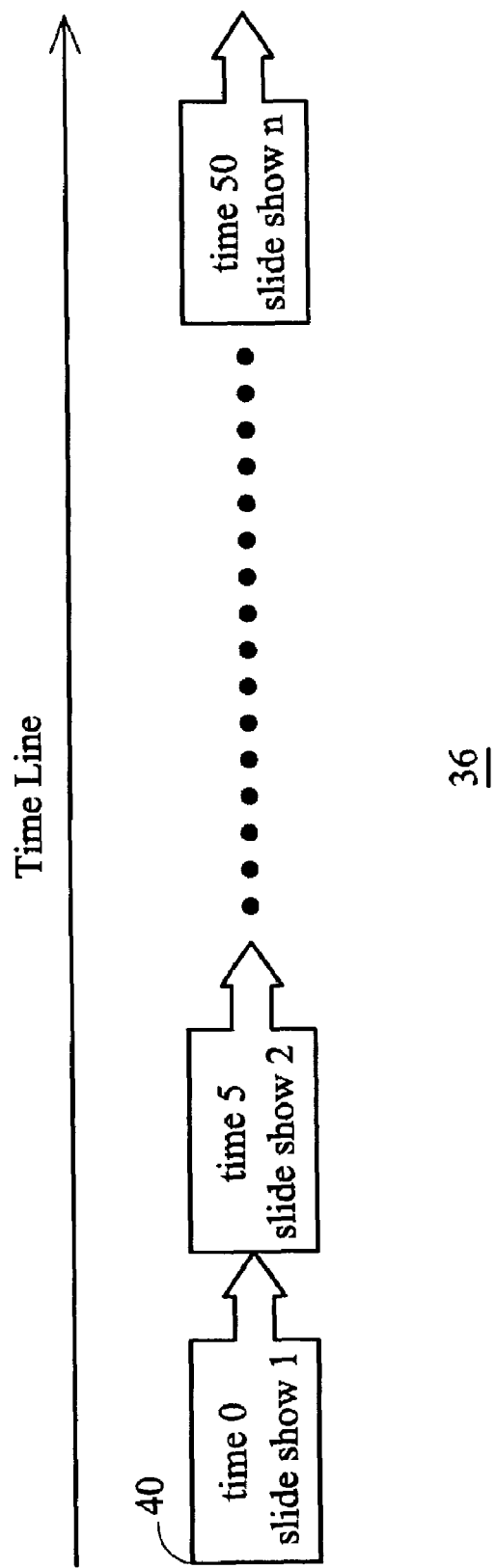
FIG. 4 is a example of rich media relational table.

FIG. 4 is a example of the rich media relational table 36. The rich media relational table 36 may be frame based or time based, such that the rich media relational table 36 is synchronized to the digital data. The rich media relational table 36 may contain a plurality of event labels 40. The event label 40 may include the time and media information corresponding to the action instruction.

If the random access module 32 receives an interrupt instruction, the random access module 32 stops the recording process of the recording module 31 in response to the interrupt instruction. After the recording process is stopped, the random access module 32 may provide functions to locate a location in the digital data in the non-sequential storage module 35. Note that, the location may be determined according to frame based or time based. Then, the random access module 32 disables the event labels located after the location in the rich media relational table 36.

After the rich media relational table 36 is updated, the random access module 32 reinstates the recording module 31 to record the rich media source 39 captured by the capture module 30 into the non-sequential storage module 35 at the position following the location in the digital data.

The review module 34 may display the digital data recorded by the recording module 31 concurrently with the recording process or the digital data located by the random access module 32. When the digital data recorded in the non-sequential storage module 35 is going to be played, the play module 37 will instruct a corresponding media player 38 to play the digital data according to the event labels in the rich media relational table 36. For example, when the digital data is played at a time point with an event label designating a chosen web page, the play module 37 will instruct a embedded browser to browse the web page.

Figure 5:
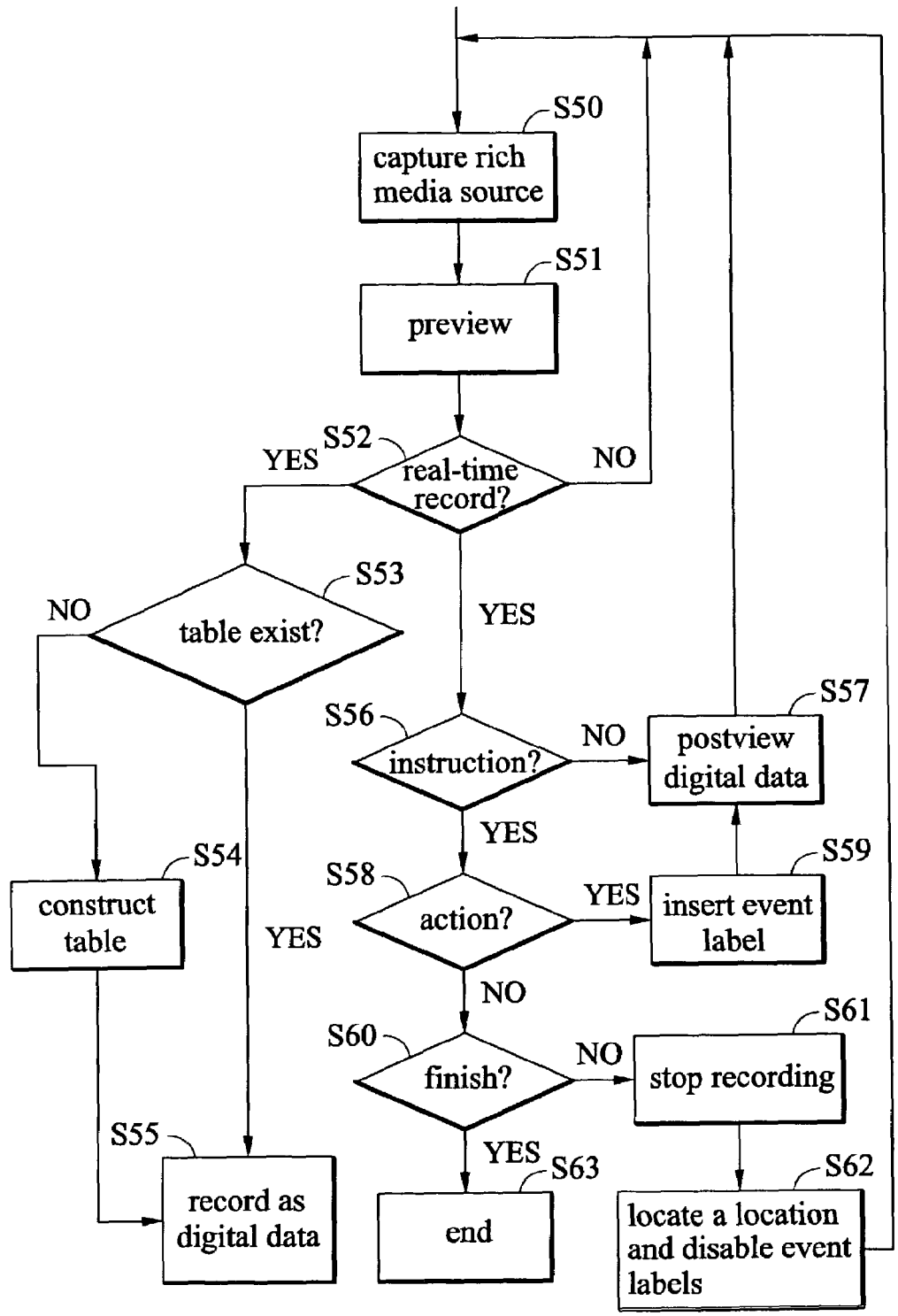
FIG. 5 is a flow chart illustrating the operation of a real-time rich media recording method according to the embodiment of the present invention.

FIG. 5 shows the operation of a real-time rich media recording method according to the embodiment of the present invention.

First, in step S50, a rich media source 39 is captured. At the same time, in step S51, the captured rich media source 39 is displayed by the preview module 33. Then, in step S52, the rich media source 39 is determined as desired or not. If the rich media source 39 is determined not to be desired (NO in step S52), the operation returns to step S50.

If the rich media source 39 is determined to be desired (YES in step S52), in step S53, a rich media relational table 36 corresponding to the rich media source 39 is sought in the non-sequential storage module 35. If the rich media relational table 36 is present in the non-sequential storage module 35 (YES in step S53), in step S55, the rich media source 39 is real-time recorded as digital data into the non-sequential storage module 35.

If, the rich media relational table 36 is not present in the non-sequential storage module 35 (NO in step S53), in step S54, the rich media relational table 36 corresponding to the rich media source 39 is constructed. Then, in step S55, the rich media source 39 is real-time recorded as digital data into the non-sequential storage module 35.

Further, when the rich media source 39 is recorded, the method will determine whether any instructions are received simultaneously (step S56). If there are no instructions, in step S57, the recorded digital data is displayed by the review module 34, and the system returns to step S50.

If an action instruction is received (YES in step S58), in step S50, an event label is inserted into the rich media relational table 36 in response to an action instruction concurrent with the recording of the rich media source 39. If a finish instruction is received (YES in step S60), in step S63, the recording process is finished.

Otherwise, an interrupt instruction is received (NO in step S60), in step S61, the recording process is stopped in response to the interrupt instruction. Then, in step S62, a location in the digital data in the non-sequential storage module 35 is located, and the event labels located after the location are disabled in the rich media relational table 36. Finally, the system returns to step S50, the rich media source is reinstated to be recorded into the non-sequential storage module 35 at the position following the location in the digital data.

As a result, using a real-time rich media recording system and method according to the present invention, rich media can be recorded and presented in combination with video clips in one pass, so as to reduce the complexity of operation in recording rich media.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A real-time rich media recording system, comprising:
   a capture module for capturing a rich media source, where the rich media source comprises a plurality of media types;
   a recording module to real-time record the rich media source captured by the capture module as digital data into a non-sequential storage module, construct a rich media relational table corresponding to the digital data, and insert an event label into the rich media relational table in response to an action instruction concurrent with the recording of the rich media source, where the event label comprises a time point of the insertion of the action instruction and at least one of the media types;
   a random access module to stop the recording process of the recording module in response to an interrupt instruction, locate a location in the digital data in the non-sequential storage module, disable the event labels located after the location in the rich media relational table, and reinstate the recording module to record the rich media source into the non-sequential storage module at the position following the location in the digital data; and a play module to instruct a media player corresponding to the media type recorded in the event label in the rich media relational table at the time point to play the digital data.

2. The system as claimed in claim 1 further comprising a preview module to display the rich media source captured by the capture module.

3. The system as claimed in claim 2 further comprising a review module to display the digital data.

4. The system as claimed in claim 1 wherein the media types of the rich media source comprise video.

5. The system as claimed in claim 1 wherein the media types of the rich media source comprise audio.

6. The system as claimed in claim 1 wherein the media types of the rich media source comprise a slide show.

7. The system as claimed in claim 1 wherein the media types of the rich media source comprise a web page.

8. The system as claimed in claim 1 wherein the play module further instincts the media player corresponding to a web page recorded in the event label in the rich media relational table at the time point to instinct a embedded browser to browse the web page.

9. An real-time rich media recording method, comprising the steps of:
    recording a rich media source as digital data into a non-sequential storage module, where the rich media source comprises a plurality of media types;
    constructing a rich media relational table corresponding to the digital data;
    inserting an event label into the rich media relational table in response to an action instruction concurrent with the recording of the rich media source, where the event label comprises a time point of the insertion of the action instinction and at least one of the media types;
    stopping recording the rich media source in response to an interrupt instinction;
    locating a location in the digital data in the non-sequential storage module, disabling the event labels located after the location in the rich media relational table, and reinstating to record the rich media source into the non-sequential storage module at the position following the location in the digital data; and
    instructing a media player conesponding to the media type recorded in the event label in the rich media relational table at the time point to play the digital data.

10. The method as claimed in claim 9 further providing a capture module to capture the rich media source.

11. The method as claimed in claim 9 further displaying the rich media source.

12. The method as claimed in claim 9 further displaying the digital data.

13. The method as claimed in claim 9 wherein the media types of the rich media source comprise video.

14. The method as claimed in claim 9 wherein the media types of the rich media source comprise audio.

15. The method as claimed in claim 9 wherein the media types of the rich media source comprise a slide show.

16. The method as claimed in claim 9 wherein the media types of the rich media source comprise a web page.

17. The method as claimed in claim 9 further instructing the media player conesponding to a web page recorded in the event label in the rich media relational table at the time point to instruct a embedded browser to browse the web page.

18. A real-time rich media recording system, comprising:
    a recording module to real-time record a rich media source comprising a plurality of media types as digital data into a digital non-sequential storage module, construct a time relational table conesponding to the digital data, and update the time relational table in response to an action instruction concurrent with the recording of the rich media source;
    a random access module to stop the recording process of the recording module in response to an interrupt instruction, locate a location in the digital data according to the time relational table, update the time relational table, and reinstate the recording module to record the rich media source at the position following the location in the digital data; and
    a play module to instruct a media player according to the update corresponding to the action instruction in the time relational table at a time point to play the digital data.

19. The system as claimed in claim 18 further comprising a capture module to capture the rich media source.

20. The system as claimed in claim 18 further comprising a preview module to display the rich media source.

21. The system as claimed in claim 18 further comprising a review module to display the digital data.

22. The system as claimed in claim 18 wherein the media types of the rich media source comprise video.

23. The system as claimed in claim 18 wherein the media types of the rich media source comprise audio.

24. The system as claimed in claim 18 wherein the media types of the rich media source comprise a slide show.

25. The system as claimed in claim 18 wherein the media types of the rich media source comprise a web page.

26. The system as claimed in claim 18 wherein the recording module updates the time relational table in response to the action instruction by inserting an event label into the time relational table, where the event label comprises the time point instructing the media player and at least one of the media types corresponding to the media player.

27. The system as claimed in claim 26 wherein the random access module updates the time relational table by disabling the event labels located after the location in the time relational table.

* * * * *